(12) United States Patent
Roberts et al.

(10) Patent No.: US 8,056,677 B1
(45) Date of Patent: Nov. 15, 2011

(54) LIFT SYSTEM WITH ARTICULABLY JOINED SUBCHASSIS

(75) Inventors: Roy Roberts, Melba, ID (US); Fred K. O'Brien, Eagle, ID (US)

(73) Assignee: Roberts Equipment, Inc., Melba, ID (US)

( * ) Notice: Subject to any disclaimer, the term of this patent is extended or adjusted under 35 U.S.C. 154(b) by 0 days.

(21) Appl. No.: 12/842,818

(22) Filed: Jul. 23, 2010

Related U.S. Application Data

(60) Provisional application No. 61/228,064, filed on Jul. 23, 2009.

(51) Int. Cl.
*E04G 1/22* (2006.01)
*E04G 3/28* (2006.01)

(52) U.S. Cl. .................. 182/148; 280/6.153; 280/6.154

(58) Field of Classification Search .............. 56/328.1, 56/209, 332, 340.1; 182/2.1, 2.2, 69.4, 69.6, 182/148, 419, 2.11, 141; 280/6.15, 6.151, 280/6.155, 6.153, 6.154, 400, 404; 180/9.42, 180/9.36, 419, 420; 187/224, 225
See application file for complete search history.

(56) References Cited

U.S. PATENT DOCUMENTS

| | | | | |
|---|---|---|---|---|
| 938,625 A * | 11/1909 | Anderson | ...................... | 187/243 |
| 1,901,726 A * | 3/1933 | Bonnet | ........................ | 182/101 |
| 2,450,152 A | 9/1948 | Miller | | |
| 2,642,293 A * | 6/1953 | Simmons | ...................... | 280/420 |
| 2,798,623 A | 7/1957 | Girardi | | |
| 2,821,312 A * | 1/1958 | Wiegel | .......................... | 414/508 |
| 2,973,112 A | 2/1961 | Young | | |
| 3,225,852 A * | 12/1965 | Simmons et al. | ............ | 180/14.2 |
| 3,329,290 A * | 7/1967 | Lowery | ......................... | 414/508 |
| 3,356,196 A | 12/1967 | Sims, Sr. | | |
| 3,523,404 A | 8/1970 | Girardi | | |
| 3,570,627 A * | 3/1971 | Michelson | .................... | 182/148 |
| 3,933,224 A * | 1/1976 | Nilsson et al. | ................ | 187/222 |
| 4,258,825 A * | 3/1981 | Collins | .......................... | 182/14 |
| 4,282,794 A * | 8/1981 | Miller et al. | ................. | 89/36.15 |
| 4,888,941 A * | 12/1989 | Gerber | ......................... | 56/328.1 |
| 5,203,425 A * | 4/1993 | Wehmeyer | ...................... | 182/19 |
| 5,271,482 A * | 12/1993 | Walz | ............................. | 182/69.6 |
| 5,273,132 A * | 12/1993 | Sasaki et al. | ................. | 182/148 |
| 5,755,306 A * | 5/1998 | Kraemer et al. | .............. | 182/148 |
| 5,803,204 A * | 9/1998 | White et al. | ................. | 182/148 |
| 5,878,562 A * | 3/1999 | Cernusco | ..................... | 56/328.1 |

(Continued)

FOREIGN PATENT DOCUMENTS

GB 2139164 A * 11/1984

*Primary Examiner* — Thomas Will
*Assistant Examiner* — Joan Misa
(74) *Attorney, Agent, or Firm* — Your Intellectual Property Matters, LLC; Robert A. Frohwerk

(57) ABSTRACT

This lift system serves as a powered ladder having a small footprint. The system is divided into two subchasses with a mast fixedly attached to a first subchassis for support of a liftable platform which may carry a human operator. Maneuverability is accomplished by a virtual articulating joint between the two subchasses. The joint comprises hydraulic cylinders operating in conjunction with wheel struts to form a three-point support. Articulation enables the lift system to be adjusted on sloped or uneven terrain to maintain the mast in a vertical orientation. One use of the lift system is to carry a fruit picker into an orchard or vineyard and to position the picker to work efficiently. The lift system may carry a robot and may be controlled either locally or remotely.

3 Claims, 10 Drawing Sheets

U.S. PATENT DOCUMENTS

| | | | | |
|---|---|---|---|---|
| 5,992,572 A * | 11/1999 | Gilliland et al. | ............... | 187/231 |
| 6,371,243 B1 * | 4/2002 | Donaldson et al. | .......... | 182/69.4 |
| 6,378,652 B1 * | 4/2002 | Albert | .................... | 182/69.4 |
| 6,401,864 B1 * | 6/2002 | Stringer et al. | ............... | 182/148 |
| 7,082,744 B2 * | 8/2006 | Briesemeister et al. | ...... | 56/328.1 |
| 7,131,651 B2 * | 11/2006 | Laursen | .................... | 280/6.154 |
| 7,407,166 B2 * | 8/2008 | Briesemeister et al. | ... | 280/6.154 |
| 7,543,671 B2 * | 6/2009 | Donaldson | .................... | 180/209 |
| 2004/0035636 A1 * | 2/2004 | Julien | .......................... | 182/69.6 |
| 2006/0070816 A1 * | 4/2006 | Schroder | ....................... | 187/222 |
| 2007/0125599 A1 * | 6/2007 | Campbell et al. | ............. | 182/148 |

* cited by examiner

LIFT SYSTEM WITH ARTICULABLY JOINED SUBCHASSIS

FIELD OF THE INVENTION

The present invention relates generally to a system for the collection and handling of fruit in an orchard. In particular, this invention includes a manlift fruit harvester which carries an operator, and from which the operator harvests tree fruit. The example of picking apples is used, but the device and the technology of the invention can be used to harvest a number of different types of fruits, which can include the following among many others: oranges, apples, pears, peaches, nectarines, mangos, kiwi fruit, cherries, apricots, grapes, and prunes.

BACKGROUND OF THE INVENTION

Studies have shown that workers utilizing ladders to pick fruit, such as apples, from trees spend more than half of their time moving ladders and climbing up and down from them. One means of increasing worker efficiency in an orchard includes reducing the time required to manipulate the ladder. The presently described system and method provide a means for increasing worker efficiency while in an orchard environment picking tree fruit.

BRIEF SUMMARY OF THE INVENTION

The presently described fruit picking system includes a mobile platform and means of fruit conveyance with various accessories. The mobile platform is electrically powered and self-propelled, having a variable geometry to support an individual worker. The fruit conveyance mechanism includes, at its most basic configuration, a closed fruit transfer pathway. This moves the fruit to a fruit collection assembly which includes a bin filler. The purpose of this fruit picking system is to support an individual operator to efficiently remove fruit from trees or vines and to then transfer it to a packing house. The advantages of such a fruit picking system will become apparent in the detailed discussion that follows.

BRIEF DESCRIPTION OF THE DRAWINGS

The particular features and advantages of the system and methods briefly described above as well as other objects will become apparent from the following description taken in conjunction with the accompanying drawings, in which.

The following Reference Numbers may be used in conjunction with one or more of the accompanying FIGS. 1-12 of the drawings:

| | |
|---|---|
| 100 | Manlift Fruit Harvester |
| 110 | mobile platform |
| 120 | subchassis, steerable |
| 130 | steerable wheel, front, right |
| 132 | steerable wheel, front, left |
| 135 | tie rod |
| 138 | electric actuator, steering |
| 140 | subchassis, driven |
| 145 | drive motor |
| 148 | power supply for drive motor, battery |
| 150 | drive wheel, rear, right |
| 152 | drive wheel, rear, left |
| 154 | hydraulic cylinder, actuator |
| 155 | mount point for hydraulic cylinder to driven subchassis |
| 156 | mount point for hydraulic cylinder to steerable subchassis |
| 157 | wheel strut |
| 158 | mount point for wheel strut to driven subchassis |
| 159 | mount point for wheel strut to steerable subchassis |
| 160 | mast, vertical |
| 170 | basket, operator, on a liftable platform |
| 190 | control station, operator |
| 200 | fruit transfer subsystem (closed fruit transport pathway) |
| 210 | fruit harvesting tube |
| 220 | receptacle, funnel-shaped mouth |
| 230 | transfer conduit, drop chute |
| 240 | deceleration box |
| 242 | inlet to deceleration box |
| 244 | outlet from deceleration box |
| 250 | baffle |
| 255 | pad, bumper |
| 260 | turntable |
| 270 | exit aperture |
| 300 | fruit collection subsystem |
| 310 | lift tower |
| 320 | outer tube of lift tower |
| 330 | lifting mechanism |
| 340 | bin filler |
| 350 | manifold |
| 360 | first trough |
| 365 | openings in first trough |
| 370 | L-shaped gate in first trough |
| 380 | gate shaft |
| 385 | extension of gate shaft |
| 390 | second trough |
| 395 | L-shaped gate in second trough |
| 400 | bin, orchard |
| 450 | bin mover, track-driven |
| 500 | operator |
| 550 | fruit |

DETAILED DESCRIPTION OF THE INVENTION

Figure 1:
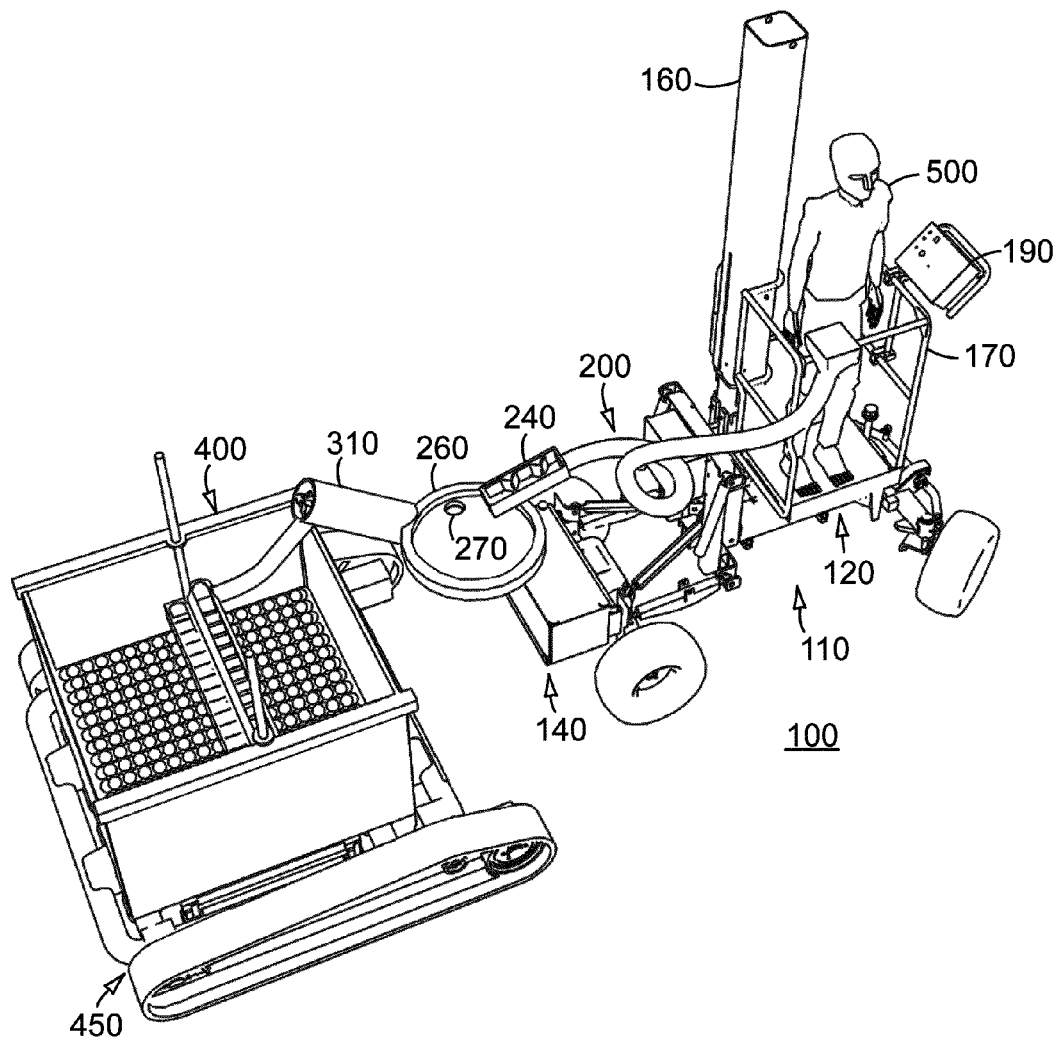
FIG. 1 is a perspective view from the working side of the fruit harvester.
Figure 2:
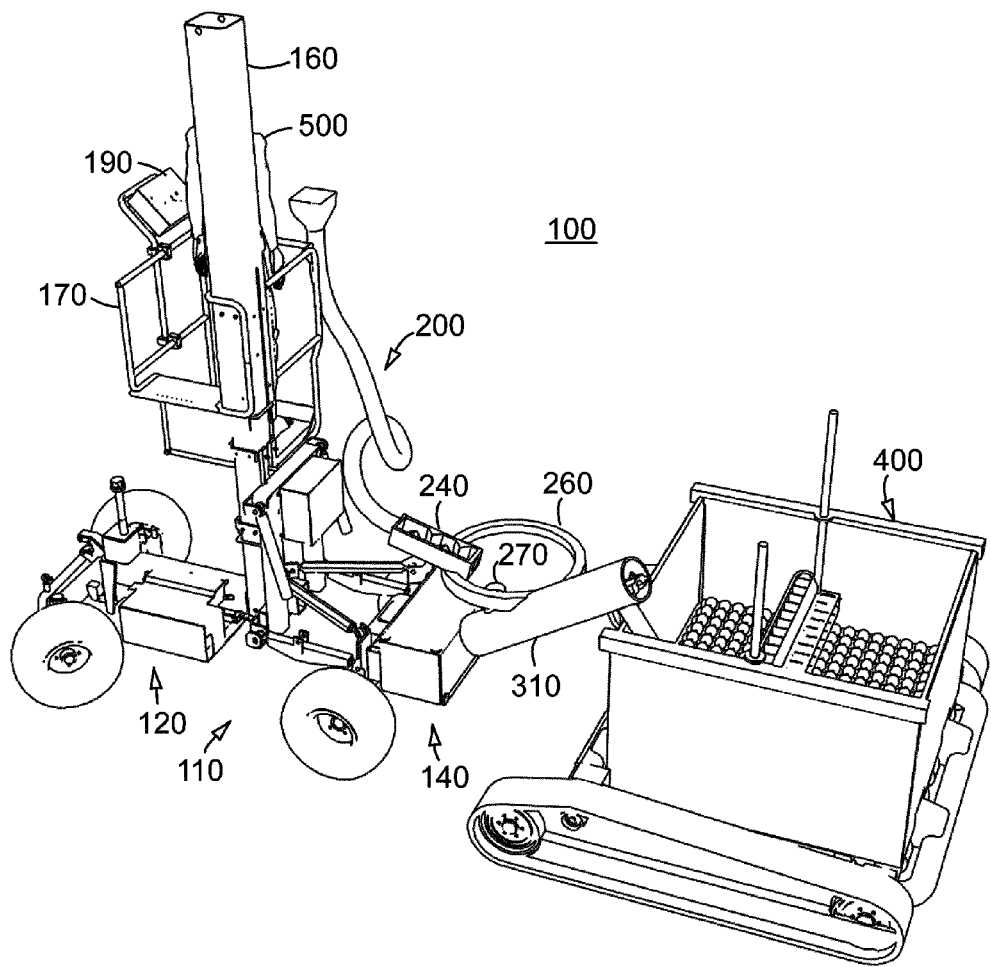
FIG. 2 is a perspective view from the side of the fruit harvester opposite the working side.

To improve the efficiency of workers in an orchard, the presently described fruit picking system includes a mobile platform to enable a worker to easily move to the fruit and a means of fruit conveyance for ease of moving the fruit to a packing house. The mobile platform is a self-propelled lift system having a variable geometry to support an individual worker. It is powered from a self-contained source, which is generally electrical in nature. The fruit conveyance mechanism provides fruit transfer and bin filling. Following is a description of the three primary subsystems, as shown in FIGS. 1 and 2. They are: 1) an electrically powered, self-propelled, variable geometry, mobile platform 110 for an individual worker; 2) a fruit transfer subsystem 200; and 3) a fruit collection subsystem 300.

The mobile platform 110 provides support from which a human picker 500 operates the automated fruit harvester system 100 to control the position from which he will pick fruit. The mobile platform 110 is built upon an articulated four-wheeled chassis, approximately the size of a golf cart, to which other subsystems and assemblies are attached. Although other configurations may be adapted, the use of four wheels provides stability while maintaining a small footprint.

Two drive wheels (150, 152) mounted to the driven subchassis 140 at the rear and two steerable wheels (130, 132) mounted to the front, steerable subchassis 120 enable maneuverability. Power for driving the wheels and controlling the unit may be derived from an on-board power supply 148, such as an electrical source in the form of a battery, as shown here, or from an internal combustion engine. The battery-powered electrical drive system is similar in function and design to that of an electric golf cart. The power source also supplies power to an electric drive motor 145 which drives a hydraulic pump.

A vertical mast 160 mounted on the steerable subchassis 120, near the center of the overall chassis, facilitates vertical movement of a liftable platform which carries a basket 170, or other protective system, such as a guard rail, to function as a work station for the operator. The lift system of the manlift fruit harvester 100 includes a leveling function achieved by articulation of the chassis so that when the drive system encounters sloping or uneven ground, the mast 160 is still maintained in a vertical orientation in order to raise or lower the operator who is supported by the horizontal base of the basket 170 on the liftable platform. The lift for the manlift platform is accomplished by any of several mechanisms including telescoping masts driven by a chain, screw or gear system, or a scissor lifting mechanism, or by any of various traction devices such as hydraulic, pneumatic, or electric lifting systems.

The second subsystem, fruit transfer, begins with a receptacle 220, mounted at the basket 170 which serves as the input to the fruit transfer conduit 230. This is a tube that directs fruit from the picking position to a deceleration box 240 located at the base of the mobile platform 110. As its descriptive name implies, the deceleration box 240 slows the fruit during its downward drop so that the fruit exits the deceleration box to gently roll out onto a turntable 260. The turntable moves the fruit to a suitable position at exit aperture 270 where the fruit drops into a lift tube 310. This is the entry into the third, fruit collection, subsystem where the fruit is deposited into an orchard bin 400. Bin Filler 340 assists to evenly distribute and layer the fruit throughout the bin. A track-driven bin mover 450, or Programmable Utility Platform (PUP), is brought into the system to retrieve bins 400 and relocate them to a central collection point for processing.

Figure 3:
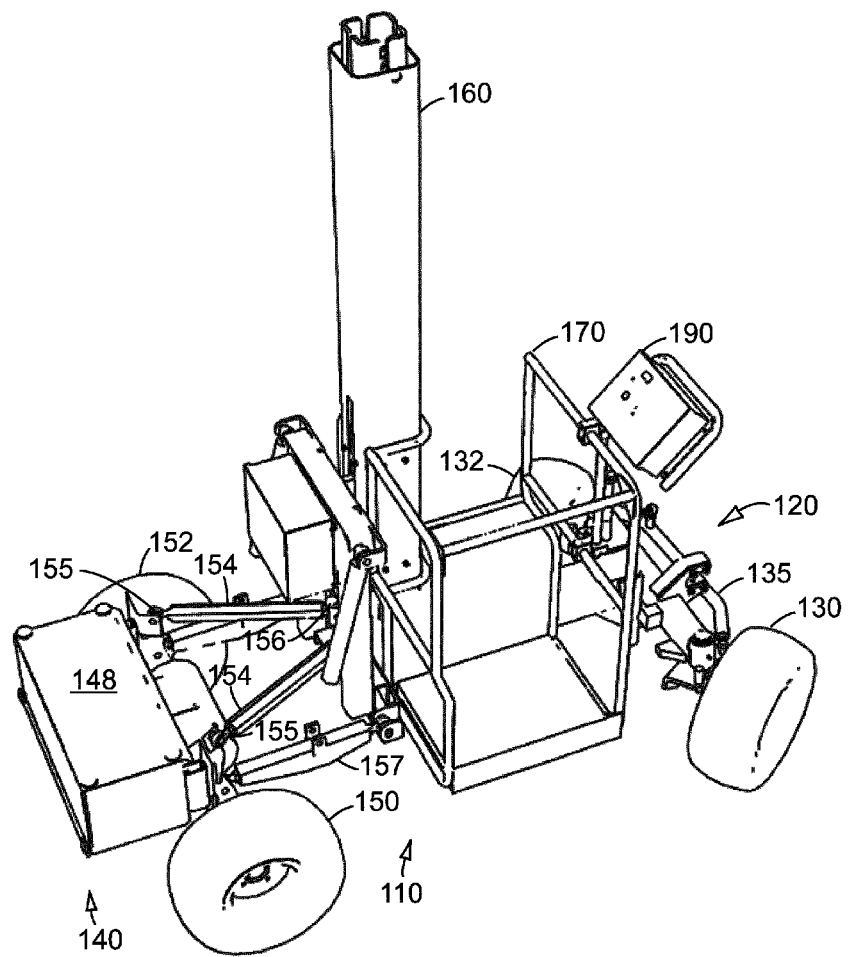
FIG. 3 shows the mobile platform in perspective.
Figure 4:
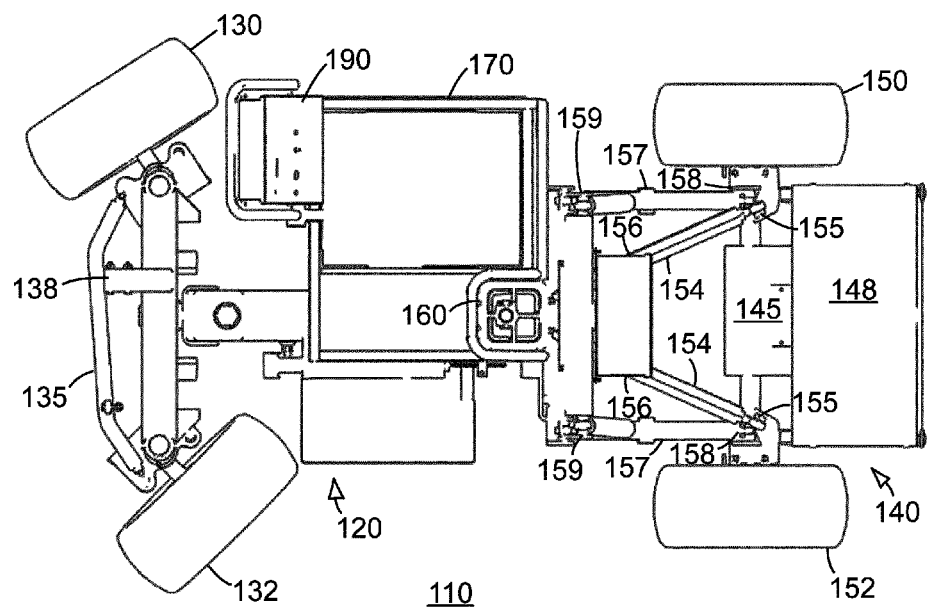
FIG. 4 is a top plan view of the mobile platform.

For further detail related to the various subsystems, refer now to FIGS. 3 and 4 as they relate to the mobile platform 110 which serves as a chassis or frame for the manlift fruit harvester 100. The function of moving and positioning the harvester for the picking of fruit and for delivery of that fruit to fruit transfer units is supplied by a drive system attached to the mobile platform. The drive system can be constructed with wheels or tracks on each side of the harvester chassis. However, for the presently described implementation, the drive system includes two rear drive wheels 150 and 152 and two steerable front wheels 130 and 132. It will be recognized that a more sophisticated system might include some configuration of all-wheel drive and/or all-wheel steering but such an exotic base is seen as unnecessary.

The chassis of the mobile platform 110 is constructed as two subchassis portions. The rear subchassis 140 is connected to the front subchassis 120 by a virtual articulating joint which provides a means for leveling the front subchassis on sloped or uneven ground to maintain the work station at an optimal attitude. The front subchassis 120 portion of the mobile platform provides mounting and support for two steerable wheels 130 and 132. The rear portion has support and mounting for two drive wheels (150, 152). The drive wheels are attached to associated wheel struts 157 at mount points 158. The opposite ends of the wheel struts are attached to the subchassis 120 at mount points 159 just behind and below the mast 160. The wheel struts 157 are fixed for a given situation but adjustable in length to accommodate extremes of terrain.

Two hydraulic cylinders 154, each associated with one of the two drive wheels (150, 152), attach to rigid mounts 156 above the chassis and behind the base of the vertical mast 160 which is fixedly attached to the front subchassis 120. The opposite ends of the hydraulic cylinders attach inside the wheel mounting positions of the associated wheels at mount points 155 on the rear driven subchassis 140. The two cylinders can extend and retract independently and variably. With each of the rear drive wheels (150, 152) mounted to a hydraulic cylinder 154 which serves as an actuator to provide a variable length leg in a three-point support configuration, articulation is achieved between the front (120) and rear (140) subchassis by means of a virtual articulating joint. The vertical angle of the mast is controlled only by wheel offset. Due to the independent variable movement of the hydraulic cylinders 154 the mast 160 can move up to 15 degrees from vertical center and a full 360 degrees about the vertical axis in one embodiment. This movement about the vertical axis provides a means for the work station to travel vertically parallel to the main trunk of a fruit tree on slopes, hillsides and other uneven terrain.

Near the center of the chassis of the mobile platform 110 a vertical mast 160 is attached. This supports an operator's workstation in the form of a basket 170 in which the operator 500 stands. A motor, under control of the operator, elevates the basket along the vertical mast 160 to properly position the picker at a selected height, preferably the optimal height for picking. The extent of the vertical mast allows an average-sized person to reach from ground level to a working height of about 14 feet.

A control station 190 is attached to the basket 170 from which the operator controls the manlift fruit harvester. Alternate implementations provide for remote control of the harvester so that an operator may or may not need to be physically present in the basket to locate fruit and to position the fruit transfer subsystem for harvest of the fruit. Other implementations provide the capability of using the basket 170 as a general-purpose liftable platform from which one or more fruit transfer subsystems are moved into contact with the fruit to be harvested.

Fruit can be removed from the tree in a number of different manners, including cutting the stem, pulling the stem off the tree, breaking the stem, or twisting or pulling the fruit away from the stem. These operations may be accomplished by an operator picking from the basket 170, or under robotic control. The fruit removal process is tailored to the particular fruit for which the harvesting machine is being used. For instance, in apples, the machine would not pull the stem off the tree because that would damage the fruiting spur on the tree. Likewise, it would not pull the fruit away from the stem, as this would open a point of infection to the fruit. For fruit such as apples, the stem is cut or lifted away from its connection to the fruit tree so that the abscission layer is broken without damage to the fruiting spur. Other fruits have specific requirements for picking and the harvester is capable of being tailored to those needs. The harvesting tube is configured to move fruit from its open end to a fruit collection assembly associated with the harvester.

Figure 5:
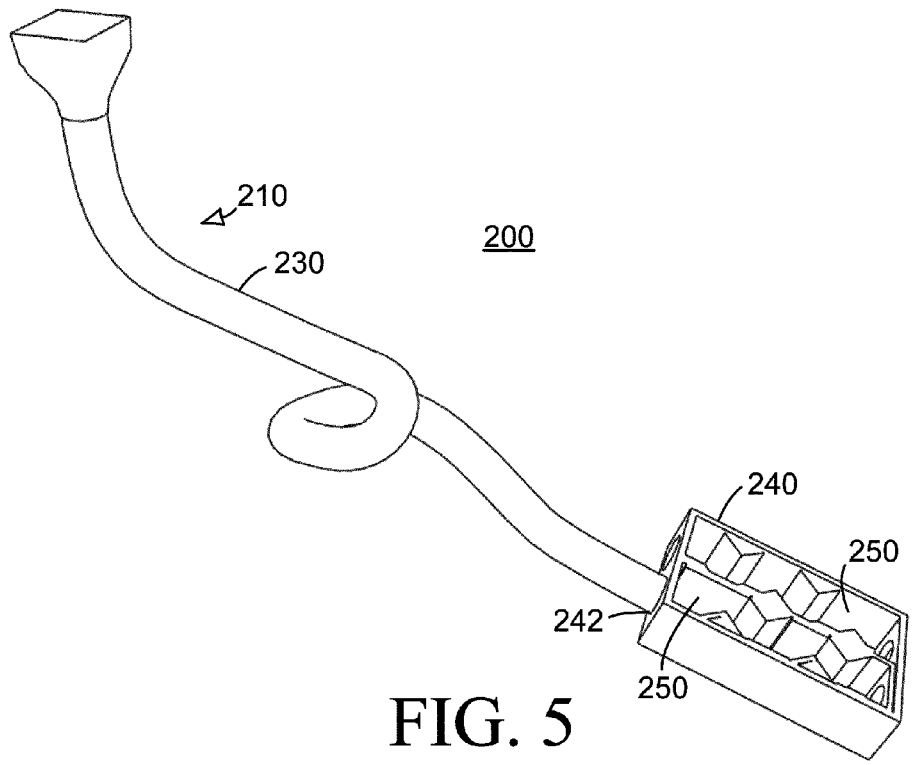
FIG. 5 shows a perspective view of the fruit transfer subsystem.
Figure 6:
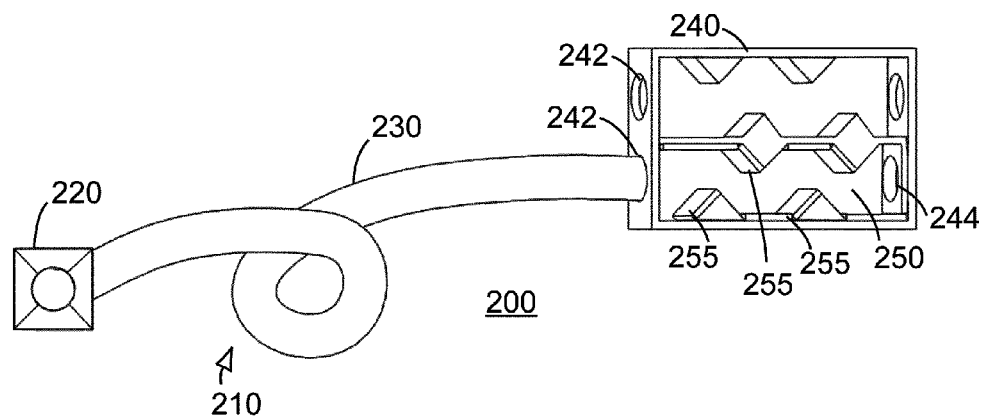
FIG. 6 provides a top plan view of the fruit transfer subsystem.

The fruit harvester system 100 includes at least one fruit harvesting tube 210 as part of the fruit transfer subsystem depicted in FIGS. 5 and 6. Each fruit harvesting tube is positioned to receive fruit as it is removed from the tree and serves as a drop chute or transfer conduit. The harvesting tube 210 has an open receptacle 220 at its receiving end which may be in the form of a funnel-shaped mouth for receiving items of fruit. The receptacle 220 is supported by, and may be mounted to, the basket 170 in order to maintain proximity to the picker for ease of access to a conveniently located receptacle. It is to be recognized that there are applications where some types of fruit may be harvested by using multiple tubes mounted to the same basket. As the picker picks fruit it is dropped into the mouth 220 which feeds into the fruit transfer conduit 230. This conduit is constructed from material selected to dampen the fall of the fruit without bruising or otherwise damaging it as it drops under the influence of gravity from the picking position to an inlet 242 of a deceleration box 240 at the far end of the conduit 230.

The fruit harvesting tube 210 may include a tube assist assembly which takes into account the motions of the operator 500 and transfers those motions to the tube to enable the operator to move the tube in a relatively effortless manner. Some implementations of a tube assist assembly use counterweights to neutralize the weight of the fruit harvesting tube 210. Other implementations are powered to duplicate, possibly with amplification, the motion of the picker's hands, arms, and fingers, in order to cause the fruit harvesting tube to move in the direction and to the position indicated by the picker.

The deceleration box 240 slows the fruit from its downward drop from the fruit transfer conduit 230. As seen in FIGS. 5 and 6, the deceleration box has an initial padded bumper 255 followed by a labyrinth of baffles 250 with a series of additional bumpers 255 alternating left and right from the path that would be taken by the fruit if it was allowed to fall unobstructed, influenced only by gravity. Each bumper is arranged at an angle of about 45-degrees from the free-fall path so that the alternation forms a zig-zag path. Each successive pair of bumpers 255 diverts the falling fruit by 90 degrees from its former travel vector. The fruit pauses briefly upon impact with each bumper and its subsequent deflection causes the inertia of the fruit to momentarily switch from kinetic to latent. Size and spacing of the baffles is adjusted to accommodate the size and type of fruit being handled. In the case of apples, for instance, as each piece of fruit collides with a baffle 250 its momentum is damped as it is redirected toward the subsequent baffle. The tilt of the base of the deceleration box 240 continues the downward pathway and further gravity-assisted motion for the now slowly moving fruit. The deceleration box 240 may be constructed with a single path for attachment to a single transfer conduit 230, as shown in FIGS. 1 and 2, or it may have multiple baffled paths, such as the dual-path implementation of FIGS. 5 and 6, for connection to a harvesting system which includes multiple transfer conduits 230. It is noted that the deceleration box is useful for slowing the fall of many types of items in addition to fruit.

Figure 7:
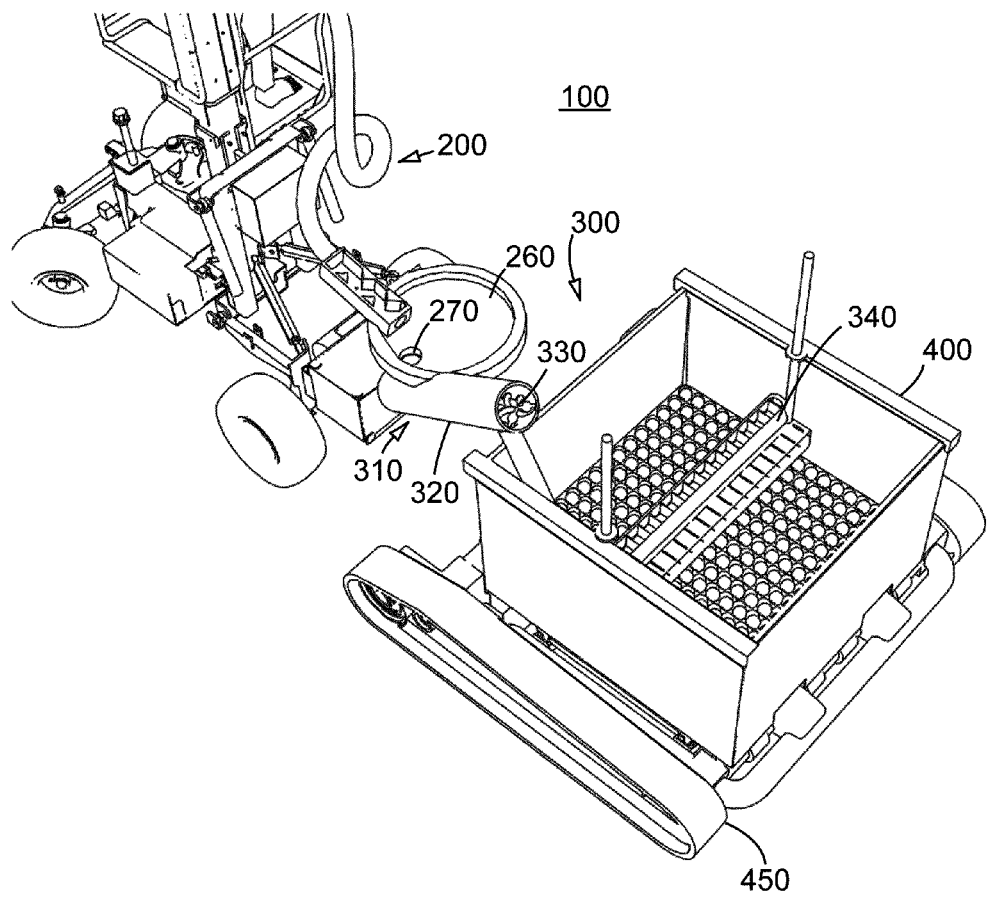
FIG. 7 shows in perspective the fruit transfer subsystem as it feeds a fruit collection subsystem.
Figure 8:
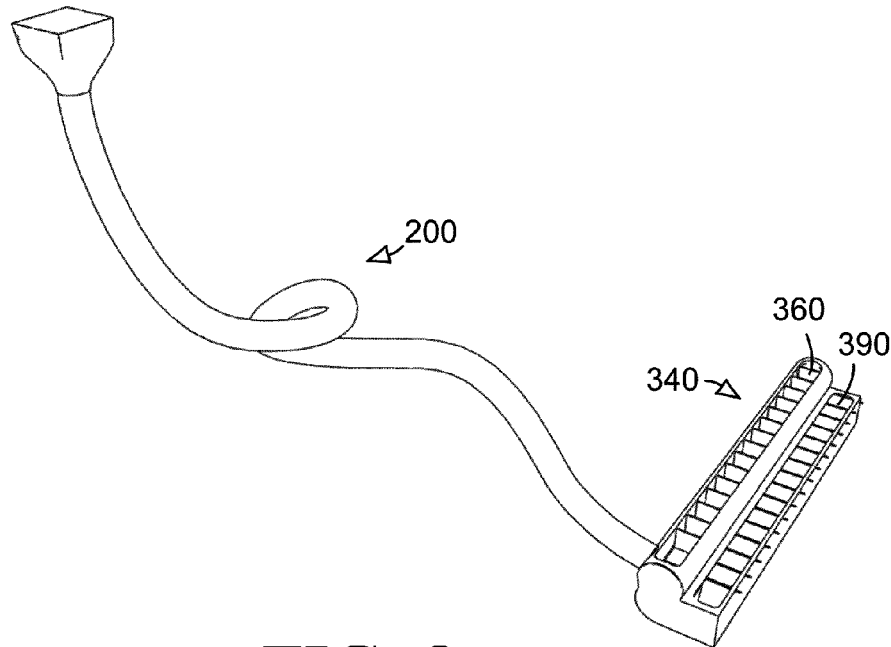
FIG. 8 is a perspective view of a bin filler subassembly.
Figure 9:
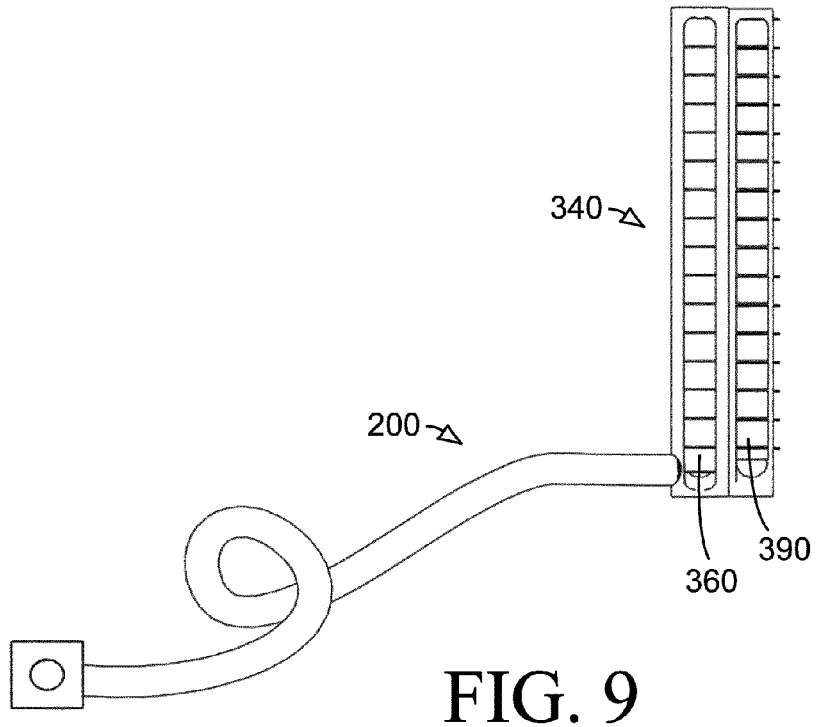
FIG. 9 is a top plan view showing the fruit transfer subsystem attached to a bin filler.

With its inertia reduced to near zero, the fruit exits the deceleration box 240 at an outlet 244 (FIG. 6) and, as shown in the system-level view of FIG. 7, gently rolls out onto a powered turntable 260. A conveyor belt could serve as a functional replacement for the turntable. Each piece of fruit is moved by the turntable to a drop-off position from where it drops through an exit aperture 270 through the turntable 260 to be received by a lift tower 310 for entry into the fruit collection subsystem 300. The lift tower raises the fruit from a lower position to an elevated position using an inner lifting mechanism 330 fitted within an outer tube 320. The lifting mechanism lifts the fruit upward and over the side of an orchard bin 400. Standard orchard bin dimensions are 48"L× 48"W×30" H. From its elevated position, the fruit is moved laterally into a fruit deposition arm. The fruit deposition arm gently lowers the fruit from the lateral mover into a fruit collection bin, with little or no dropping distance encountered by the fruit.

With the freshly picked fruit deposited from its elevated position over the inside of the orchard bin 400, the bin filler 340 takes over to evenly distribute the fruit and layer it throughout the bin. The bin filler (FIGS. 8-12) is constructed from a manifold 350 which is sized appropriately to the fruit being harvested. The manifold has two parallel troughs. The first trough 360 has openings 365 in its underside along its length at regular intervals. Each opening has an L-shaped gate 370 positioned above it. The gates function by rotation of the juncture of the vertical and horizontal legs of the "L". This rotary motion is facilitated by a shaft 380 at the juncture of the legs, with the shaft serving as a pivot point for the gates. The shaft extends into the second trough 390 where a gate 395 in the second trough is mounted to the shaft extension 385. The gate 395 in the second trough is mounted on the shaft 380 parallel to the horizontal leg of the L-shaped gate 370 in the first trough.

Figure 10:
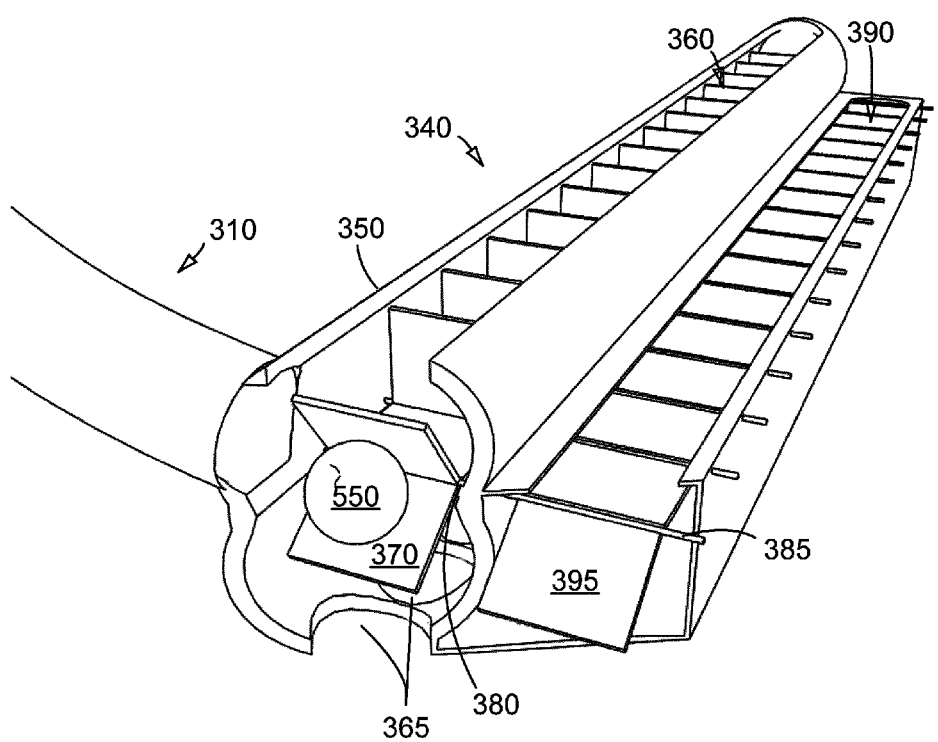
FIG. 10 shows a bin filler handling fruit with gates in Position A.
Figure 11:
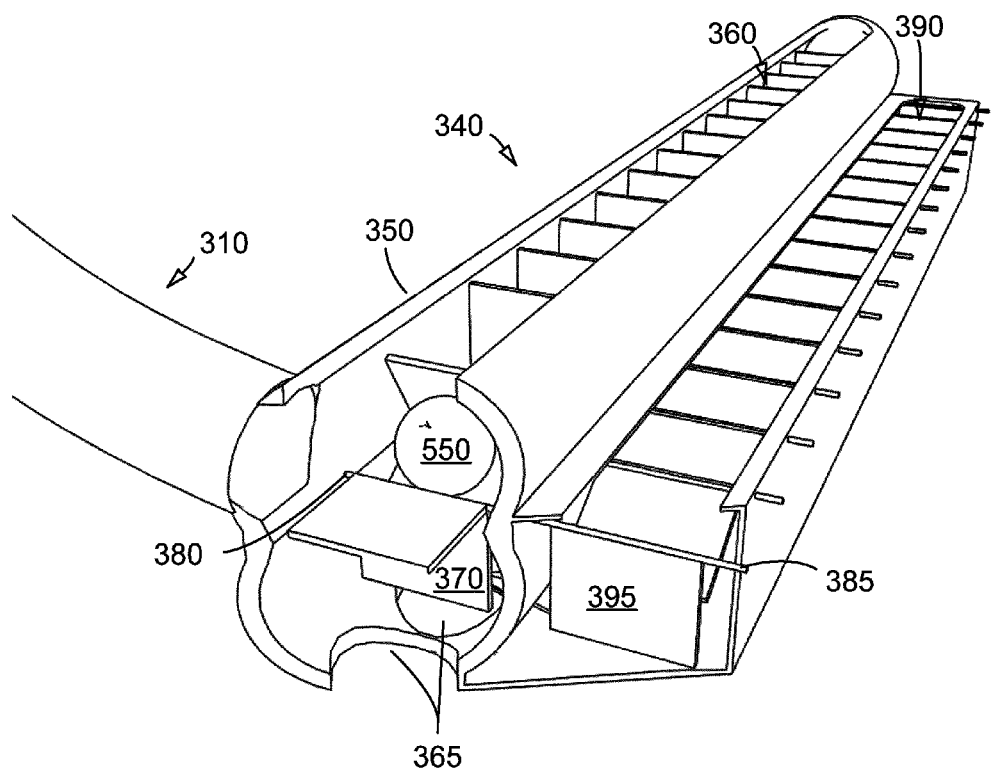
FIG. 11 is a view of bin filler with gates in Position B.
Figure 12:
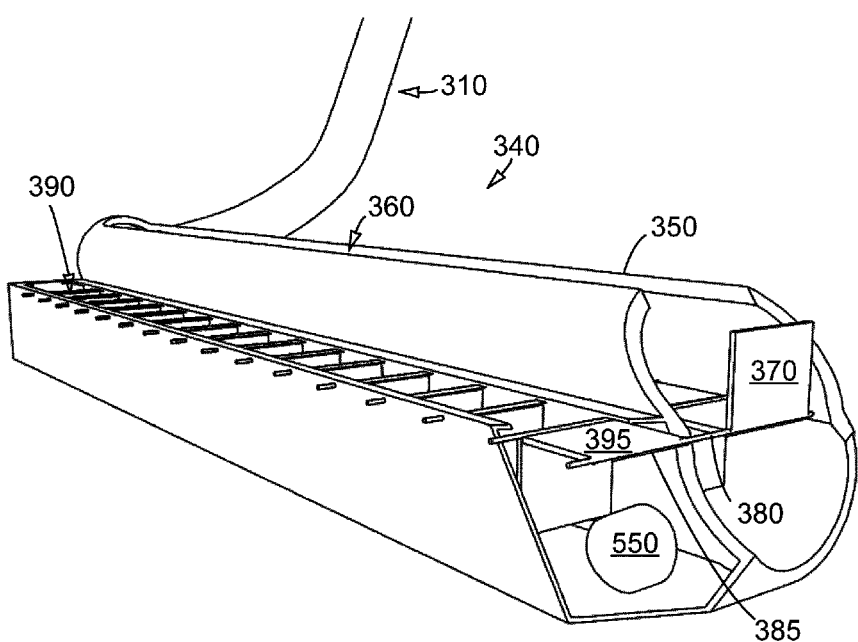
FIG. 12 is a view of the bin filler with a piece of fruit reaching the end of a row of fruit in a bin.

At the beginning of each cycle the gates are positioned in Position-A as depicted in FIG. 10. In this orientation a vertical leg of L-shaped gate 370 is pointing upward and a horizontal leg covers the opening 365 in the bottom of the manifold 350. When a piece of fruit drops from the lift tower 310 into the manifold, the first gate 370 rotates under the weight of the fruit 550, settling upon the horizontal leg. As the gate 370 rotates the fruit drops gently through the associated opening 365 into the bin 400. The vertical leg is repositioned to Position-B (FIG. 11) as a result of the rotation so that it is now horizontal, while the formerly horizontal leg now points downward. The gate 395 in the second trough 390 attached by the shaft extension 385 will also rotate into a downward pointing position.

The next piece of fruit 550 to arrive from the lift tower 310 rolls to the second gate 395 and the sequence repeats. Each arriving piece of fruit moves and trips the next sequential gate. The final gate in the sequence has an opening which directs the fruit into the second trough 390. The fruit then rolls along the length of the second trough. All of the gates 395 in the second trough 390 are positioned downward blocking the passage of the fruit. Each downward pointing gate is attached via the pivot shaft of the L-gates in the first trough 360. As the fruit 550 rolls along the second trough 390 the gate 395 is forced upward resetting the gates 370 in the first trough 360 into Position-A. The last fruit in the sequence finally drops from the manifold 350 into the bin 400.

At the end of the above sequence the bin filler 340 is advanced to a new position adjacent to the most recently positioned fruit in the bottom of the bin 400. This is accomplished by any of several means, which may be mechanical, electrical or hydraulic in nature. The mechanism is displaced by the diameter of the fruit being harvested, which is about 3-inches for apples. This sequential movement positions the bin filler such that the next sequence of fruit is laid down in a row parallel to and adjacent to the most recently placed row. When the sequence of rows completely covers the bottom surface of the bin, the bin filler 340 is raised by a distance equal to or slightly greater than the diameter of the fruit. The sequence of depositing fruit into the bottom of the bin then continues, horizontally and vertically, until the bin 400 is full at which time the bin filler 340 is positioned over a next bin and the filling sequence continues.

The fruit harvesting system further includes a bin mover 450. This is typically a low platform with a track drive on either side. The bin mover moves independently of the fruit harvester 100 and its mobile platform 110. It may use a software program, thereby acquiring an identity as a Programmable Utility Platform (PUP), or it may be remotely controllable. The bin mover 450 delivers an empty bin and positions it to engage with the fruit harvester 100, moving full bins to collection areas. The bin mover is capable of reaching under a bin to lift it up for transfer and to lower a bin to the ground to deposit it and move away.

Although the presently disclosed apparatus has been described as a fruit harvester, it will be recognized by those skilled in the related arts that portions of the system and described methods have applications in other fields. In particular, the mobile platform of the manlift fruit harvester would serve well as a scaffold or ladder for a painter of buildings or other structures, or as an all-terrain vehicle for access to maintain or service large objects. It will be obvious to those having skill in the art that changes may be made to the details of the above-described embodiments without departing from the underlying inventive principles. The scope of the present disclosure should, therefore, be determined only by the following claims.

What is claimed is:

1. A lift system, comprising:
   a mobile platform which includes
     a first subchassis, and
     a second subchassis;
   a mast fixedly attached to the first subchassis of said mobile platform;
   a liftable platform movably mounted to said mast;
   a drive system attached to said mobile platform; and
   a control station for controlling said lift system,
   wherein the drive system includes
     one or two steerable wheels mounted to the first subchassis; and
     two drive wheels,
     wherein each drive wheel is mounted to the second subchassis at a first end of an associated strut, and
       a second end of the associated strut is mounted to the first subchassis at a first associated mount point below the mast; and
     wherein each drive wheel is further mounted to a first end of an associated hydraulic cylinder at the second subchassis, and
       a second end of the associated hydraulic cylinder is mounted to the first subchassis at a second associated mount point behind a lower end of the mast at an offset from the first associated mount point,
     wherein at each drive wheel the associated strut, the associated hydraulic cylinder, and the offset between the first and second associated mount points act as three legs to form a three-point support which serves as a virtual articulating joint; and
   wherein the second subchassis is articulably joined to the first subchassis by the virtual articulating joint associated with each of the two drive wheels; and
     articulation of the second subchassis with respect to the first subchassis is accomplished by actuating one or both of the hydraulic cylinders, and
   wherein the control station controls the drive system to
     articulate so as to position said lift system to place the mast into a vertical orientation, and moves said liftable platform to a selected height.

2. The lift system of claim 1, wherein each strut is adjustable in length.

3. The lift system of claim 1, wherein the liftable platform comprises:
   a means to prevent an operator from falling off of the liftable platform.

* * * * *